United States Patent
Park et al.

(10) Patent No.: US 10,673,105 B2
(45) Date of Patent: Jun. 2, 2020

(54) SYSTEM AND METHOD FOR MANAGING BATTERY TEMPERATURE

(71) Applicants: Hyundai Motor Company, Seoul (KR); Kia Motors Corporation, Seoul (KR)

(72) Inventors: Hyun Soo Park, Anyang-si (KR); Dong Il Kim, Seongnam-si (KR); Hee Sung Moon, Seoul (KR); Bo Ram Yang, Pyeongtaek-si (KR); Hui Tae Yang, Seoul (KR); Gun Goo Lee, Suwon-si (KR); Yoon Jun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 237 days.

(21) Appl. No.: 16/008,973

(22) Filed: Jun. 14, 2018

(65) Prior Publication Data
US 2019/0190095 A1 Jun. 20, 2019

(30) Foreign Application Priority Data
Dec. 18, 2017 (KR) ........................ 10-2017-0174373

(51) Int. Cl.
| | | |
|---|---|---|
| *H01M 10/615* | (2014.01) | |
| *H01M 10/6568* | (2014.01) | |
| *H01M 10/613* | (2014.01) | |
| *H01M 10/625* | (2014.01) | |
| *H01M 10/6571* | (2014.01) | |
| *B60L 58/24* | (2019.01) | |

(52) U.S. Cl.
CPC ........... *H01M 10/615* (2015.04); *B60L 58/24* (2019.02); *H01M 10/613* (2015.04); *H01M 10/625* (2015.04); *H01M 10/6568* (2015.04); *H01M 10/6571* (2015.04)

(58) Field of Classification Search
None
See application file for complete search history.

(56) References Cited

U.S. PATENT DOCUMENTS

2015/0144614 A1* 5/2015 Kim ..................... H01M 10/63
219/494

FOREIGN PATENT DOCUMENTS

| KR | 10-2015-0059247 A | 6/2015 |
|---|---|---|
| KR | 10-2015-0120532 A | 10/2015 |

* cited by examiner

*Primary Examiner* — Wyatt P McConnell
(74) *Attorney, Agent, or Firm* — Morgan, Lewis & Bockius LLP (57) ABSTRACT

A system for managing the temperature of a battery, may include a battery configured to store electrical energy; a temperature-increase heater configured to convert the electrical energy stored in the battery into thermal energy to increase the temperature of the battery; a temperature-increase heater relay configured to connect or disconnect an electrical energy path provided from the battery to the temperature-increase heater; a thermal fuse configured to disconnect the electrical energy path when the temperature of the battery is equal to or higher than a predetermined reference temperature; and a controller configured to induce disconnection of the thermal fuse by increasing the temperature of the battery to the reference temperature or higher using the thermal energy converted by the temperature-increase heater, when the temperature-increase heater relay is fused.

19 Claims, 5 Drawing Sheets

SYSTEM AND METHOD FOR MANAGING BATTERY TEMPERATURE

CROSS-REFERENCE TO RELATED APPLICATION

The present application claims priority to Korean Patent Application No. 10-2017-0174373, filed on Dec. 18, 2017 in the Korean Intellectual Property Office, the entire contents of which is incorporated herein for all purposes by this reference.

BACKGROUND OF THE INVENTION

Field of the Invention

The present invention relates to a system and method for managing the temperature of a battery, and more particularly to, a system and method for managing the temperature of a battery, which may prevent an excessive increase of the temperature of the battery at the time of fusion of a relay that supplies power to a temperature-increase heater used for increasing the temperature of the battery and may enable normal operation of a vehicle without shutdown of the vehicle.

Description of Related Art

Eco-friendly vehicles such as electric vehicles and hybrid vehicles generate power by driving a motor with electrical energy stored in a battery. Management of the battery storing energy is a very important issue for ensuring the performance and life of the eco-friendly vehicles.

In general, the internal resistance of the battery increases in a low temperature region, resulting in a decrease in the charging and discharging efficiency. Furthermore, the battery may be overheated due to heat generated by charging and discharging, and the overheating of the battery not only degrades the performance of the battery but also shortens the life of the battery. Thus, the temperature of the battery may be properly managed.

Air-cooled or water-cooled techniques are known as conventional battery temperature management techniques. The water-cooled technique is a technique for managing the battery temperature using cooling water. In the water-cooled technique, when the battery temperature is lower than a predetermined reference temperature, the cooling water is heated and circulated by a temperature-increase heater disposed on a cooling water path, and when the battery temperature is higher than the predetermined reference temperature, the cooling water is cooled using a radiator or a chiller and circulated.

In a conventional water-cooled type battery temperature management technique, the temperature-increase heater receives power from a power supply through a relay. For example, a controller that is configured to control the battery temperature controls the turning-on/turning-off of the temperature-increase heater by turning on or off the relay based on an actual battery temperature value.

In such a conventional water-cooled type battery temperature management technique, when fusion of the relay that supplies power to the temperature-increase heater occurs, the controller shuts down the entire power of the vehicle to prevent an excessive increase of the battery temperature, interrupting the operation of the temperature-increase heater. Accordingly, conventionally, when a temperature-increase heater relay is fused, there arises a problem in that the operation of the vehicle becomes impossible.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for managing the temperature of a battery, which may prevent an excessive increase of the temperature of the battery at the time of fusion of a relay that supplies power to a temperature-increase heater used for increasing the temperature of the battery and may enable normal operation without shutdown of the vehicle.

In accordance with an aspect of the present invention, there is provided a system for managing the temperature of a battery, including: a battery configured to store electrical energy; a temperature-increase heater configured to convert the electrical energy stored in the battery into thermal energy to increase the temperature of the battery; a temperature-increase heater relay configured to connect or disconnect an electrical energy path provided from the battery to the temperature-increase heater; a thermal fuse configured to disconnect the electrical energy path when the temperature of the battery is equal to or higher than a predetermined reference temperature; and a controller configured to induce disconnection of the thermal fuse by increasing the temperature of the battery to the reference temperature or higher using the thermal energy converted by the temperature-increase heater, when the temperature-increase heater relay is fused.

In an exemplary embodiment of the present invention, the system for managing the temperature of the battery may further include a water pump configured to provide cooling water to the battery, wherein the temperature-increase heater increases the temperature of the battery by heating the cooling water with the converted thermal energy.

In an exemplary embodiment of the present invention, when the temperature-increase heater relay is fused, the controller may interrupt the operation of the water pump.

In an exemplary embodiment of the present invention, the controller may interrupt the operation of the water pump, and then may operate the water pump to cool the battery when the temperature of the cooling water has decreased at a rate exceeding a predetermined temperature decrease rate per hour since the temperature of the cooling water has increased at a rate exceeding a predetermined temperature increase rate per hour.

In an exemplary embodiment of the present invention, the controller may interrupt the operation of the water pump, and then may operate the water pump to cool the battery when a predetermined time has elapsed since the temperature of the cooling water has increased at a rate exceeding a predetermined temperature increase rate per hour.

In accordance with another aspect of the present invention, there is provided a system for managing the temperature of a battery, including: a water pump configured to circulate cooling water; a battery configured to be disposed on a circulation path of the cooling water to perform heat exchange with the cooling water, and to store electrical energy; a temperature-increase heater configured to increase the temperature of the battery by converting the electrical energy stored in the battery into thermal energy to heat the cooling water; a temperature-increase heater relay configured to connect or disconnect an electrical energy path provided from the battery to the temperature-increase heater; a thermal fuse configured to disconnect the electrical energy path when the temperature of the cooling water is equal to or higher than a predetermined reference temperature; a radiator configured to be disposed on the circulation path of the cooling water to decrease the temperature of the cooling water; a valve configured to be opened or closed to change the circulation path of the cooling water; and a controller configured to determine the circulation path of the cooling water by adjusting the valve when the temperature-increase heater relay is fused, and to induce the disconnection of the thermal fuse by interrupting the operation of the water pump and increasing the temperature of the cooling water to the reference temperature or higher using the thermal energy converted by the temperature-increase heater.

In an exemplary embodiment of the present invention, a first circulation path through which the cooling water flows between the radiator and the battery and a second circulation path through which the flow of the cooling water is blocked between the radiator and the battery may be formed by opening or closing the valve.

In an exemplary embodiment of the present invention, the second circulation path may be a circulation path through which the cooling water flows among the water pump, the battery, and the temperature-increase heater.

In an exemplary embodiment of the present invention, when the temperature-increase heater relay is fused, the controller may form the second circulation path by adjusting the valve and may interrupt the operation of the water pump.

In an exemplary embodiment of the present invention, the controller may interrupt the operation of the water pump, and then may operate the water pump to cool the battery when the temperature of the cooling water has decreased at a rate exceeding a predetermined temperature decrease rate per hour since the temperature of the cooling water has increased at a rate exceeding a predetermined temperature increase rate per hour.

In an exemplary embodiment of the present invention, the controller may interrupt the operation of the water pump, and then may operate the water pump to cool the battery when a predetermined time has elapsed since the temperature of the cooling water has increased at a rate exceeding a predetermined temperature increase rate per hour.

In accordance with yet another aspect of the present invention, there is provided a method for managing the temperature of a battery using the system for managing the temperature of the battery, including: monitoring whether the temperature-increase heater relay is fused; interrupting the operation of the water pump when it is determined that the temperature-increase heater relay is fused; and monitoring the temperature of the cooling water after the operation of the water pump is interrupted, and determining whether the thermal fuse is disconnected based on the temperature of the cooling water or a temperature increase or decrease rate of the cooling water.

In an exemplary embodiment of the present invention, the determining may include determining that the thermal fuse is disconnected when the temperature of the cooling water increases to a predetermined temperature or higher and then decreases.

In an exemplary embodiment of the present invention, the determining may include determining that the thermal fuse is disconnected when the temperature of the cooling water has decreased at a rate exceeding a predetermined temperature decrease rate per hour since the temperature of the cooling water has increased at a rate exceeding a predetermined temperature increase rate per hour.

In an exemplary embodiment of the present invention, the determining may include determining that the thermal fuse is disconnected when a predetermined time has elapsed since the temperature of the cooling water has increased at a rate exceeding a predetermined temperature increase rate per hour.

In an exemplary embodiment of the present invention, after it is determined that the thermal fuse is disconnected in the determining, the method for managing the temperature of the battery may further include operating the water pump again.

According to the system and method for managing the temperature of the battery according to various embodiments of the present invention, it is possible to disconnect the thermal fuse of the power line of the temperature-increase heater by inducing a rapid temperature increase, in a state in which the operation of the temperature-increase heater cannot be interrupted through the control of the temperature-increase heater relay due to the fusion of the temperature-increase heater relay, interrupting the operation of the temperature-increase heater. Accordingly, according to the system and method for managing the temperature of the battery according to various embodiments of the present invention, it is possible to operate the battery without shutting down the vehicle itself when the temperature-increase heater relay is fused as in the conventional case, so that the vehicle may be normally driven.

Also, according to the system and method for managing the temperature of the battery according to various embodiments of the present invention, it is possible to separate the cooling water path into a path for cooling the electric parts and a path for cooling the battery when the temperature-increase heater relay is fused and to induce a rapid temperature increase only in the path for cooling the battery to disconnect the thermal fuse, preventing adverse influence on the cooling of the electric parts.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a system and method for managing a battery temperature according to various embodiments of the present invention will be described in detail with reference to the accompanying drawings.

Figure 1:
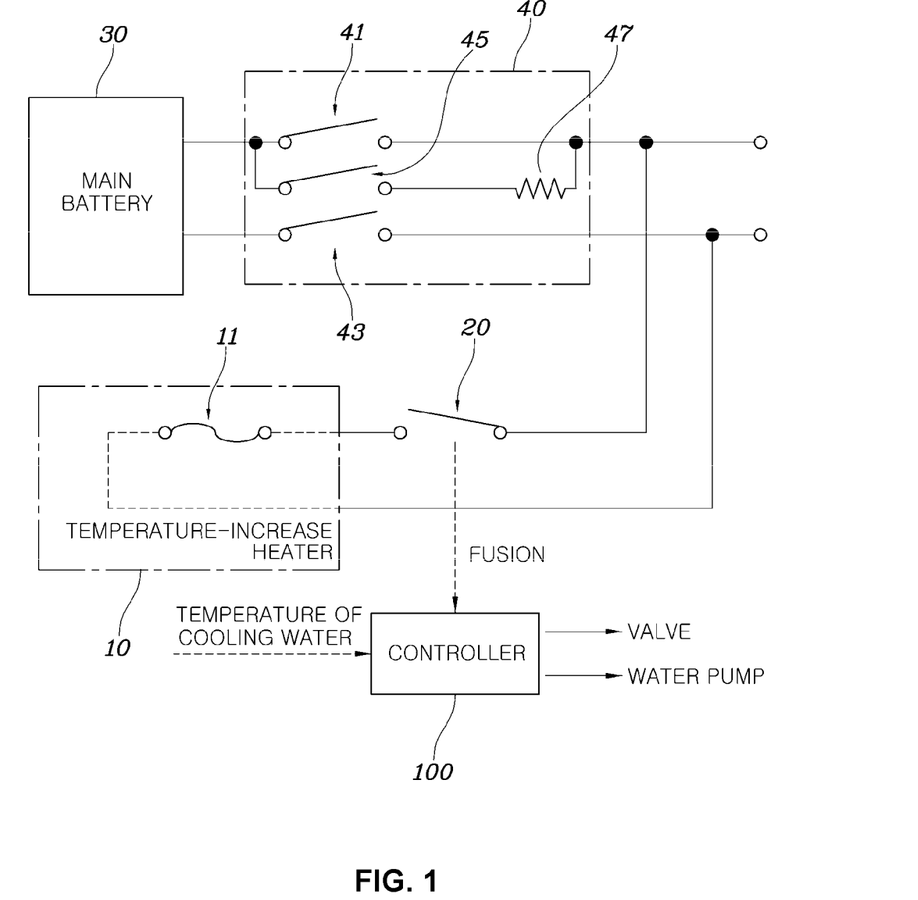
FIG. 1 is a block diagram illustrating a system for managing the temperature of a battery according to an exemplary embodiment of the present invention.

FIG. 1 is a block diagram illustrating a system for managing a battery temperature according to an exemplary embodiment of the present invention.

Referring to FIG. 1, the system for managing the battery temperature according to an exemplary embodiment of the present invention may include a battery 30 configured to store electrical energy, a temperature-increase heater 10 configured to convert the electrical energy stored in the battery 30 into thermal energy to increase the temperature of the battery 30, a temperature-increase heater relay 20 configured to connect or disconnect an electrical energy path provided from the battery 30 to the temperature-increase heater 10, a thermal fuse 11 configured to disconnect the electrical energy path when the temperature of the battery is equal to or higher than a predetermined reference temperature, and a controller 100 configured to induce disconnection of the thermal fuse 11 by increasing the temperature of the battery to the reference temperature or higher using the thermal energy converted by the temperature-increase heater 10 when the temperature-increase heater relay 20 is fused.

The battery 30 is an energy storage device configured for storing electrical energy supplied to a motor for driving an eco-friendly vehicle, and is usually called a main battery in the eco-friendly vehicle. The battery 30 not only supplies energy to a driving motor of the eco-friendly vehicle, but also supplies power to auxiliary machinery using a power voltage corresponding to the voltage of the battery 30. In an exemplary embodiment of the present invention, the battery 30 may provide power to the temperature-increase heater 10.

A power relay assembly 40 may be provided at a terminal of the battery 30. The power relay assembly 40 may include main relays 41 and 43 respectively connected to a positive (+) terminal of the battery 30 and a negative (−) terminal thereof, and a precharge relay 45 connected to both end portions of the main relay 41 in a parallel relation therebetween via a resistor 47. To prevent an overcurrent from being introduced at the start of a vehicle, the precharge relay 45 and the main relay 43 are first short-circuited so that the current of the battery 30 is applied to a vehicle system through a precharge resistor 47, and then the precharge relay 45 is opened and the main relay 41 is short-circuited after a predetermined time has elapsed (not illustrated, but after the time during which a capacitor connected to the rear end portion of the power relay assembly 40 is charged has elapsed), completing the start of the vehicle.

Conventionally, when it is determined that fusion of the temperature-increase heater relay 20 occurs, the temperature of the battery 30 may be prevented from being excessively increased by forcibly opening the main relays 41 and 43 of the power relay assembly 40. However, in the instant case, the entire power supplied to the vehicle system is shut off, causing the vehicle itself to shut down, which makes it impossible to operate the vehicle. In various embodiments of the present invention, the temperature of the battery 30 may be prevented from being excessively increased despite the fusing of the temperature-increase heater relay 20, without opening the main relays 41 and 43 of the power relay assembly 40, and the vehicle may be operated.

The temperature-increase heater 10 is an element for generating thermal energy that can increase the temperature of the battery 30, and may receive electrical energy from the battery 30 and may convert the received electrical energy into thermal energy. In a water cooling system, the temperature-increase heater 10 is provided in a line for providing cooling water to the battery 30, and may increase the temperature of the battery 30 by increasing the temperature of the cooling water with the converted thermal energy.

The temperature-increase heater relay 20 may be disposed in an electrical energy supply path so that the electrical energy stored in the battery 30 may be supplied to the temperature-increase heater 10. The temperature-increase heater relay 20 may be controlled to be opened or short-circuited by the controller 100.

The controller 100 may allow the temperature-increase heater relay 20 to be short-circuited when the temperature of the battery 30 is lower than the predetermined reference temperature, and may open the temperature-increase heater relay 20 when the temperature of the battery 30 is equal to or higher than the predetermined reference temperature. Here, the temperature of the battery 30 may be determined indirectly by use of a value detected by a temperature sensor disposed in the battery itself or by a sensor for detecting the temperature of the cooling water on a cooling water line through which the cooling water supplied to the battery 30 flows.

Furthermore, when it is determined that the temperature-increase heater relay 20 is fused, the controller 100 may control a water pump provided on the cooling water line to rapidly increase the temperature of the cooling water for cooling the battery 30, a valve for determining the cooling water path, and the like. Various methods based on the ordinary skill in the art may be applied to the determination of whether the temperature-increase heater relay 20 is fused. For example, a method of detecting that a voltage difference between both end portions of the temperature-increase heater relay 20 is not still generated after the controller 100 transmits a control signal for opening the temperature-increase heater relay 20 to the temperature-increase heater relay 20, or a method of detecting that a current still flows into the electric line to which the temperature-increase heater relay 20 is connected may be applied. As an exemplary embodiment of the present invention, when the temperature of the cooling water increases at a certain rate or more even after a predetermined time has elapsed since the controller 100 has transmitted the control signal for opening the temperature-increase heater relay 20 to the temperature-increase heater relay 20, it may be determined that temperature-increase heater relay 20 is fused.

A detailed operation of the controller 100 may be more clearly understood through a description of a method for managing the temperature of a battery according to an exemplary embodiment of the present invention to be described later.

The thermal fuse 11 is disposed in a path where electrical energy is supplied from the battery 30 to the temperature-increase heater 10, and is a fuse having a characteristic that the thermal fuse 11 is disconnected when the ambient temperature increases to a predetermined value or higher, unlike a normal fuse which is disconnected when a current of a predetermined magnitude or more flows. In an exemplary embodiment of the present invention, it is possible to interrupt the operation of the temperature-increase heater 10 by inducing the disconnection of the thermal fuse 11 when it is determined that the temperature-increase heater relay 20 is fused.

In FIG. 1, the thermal fuse 11 is disposed inside the temperature-increase heater 10. However, in the case where the temperature-increase heater 10 itself does not have the thermal fuse 11, the thermal fuse 11 may be disposed on a path on which external electrical energy of the temperature-increase heater 10 is provided. However, the thermal fuse 11 may be disposed at a position where it can operate according to the temperature change of the cooling water.

Figure 2:
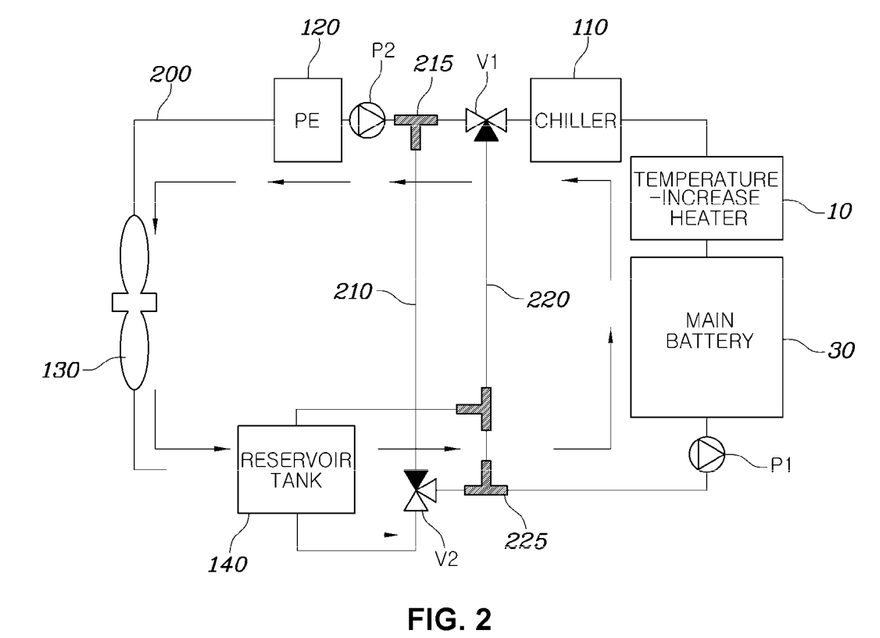
FIG. 2 and FIG. 3 illustrate examples of a water cooling system to which a system for managing the temperature of a battery according to an exemplary embodiment of the present invention is applied.
Figure 3:
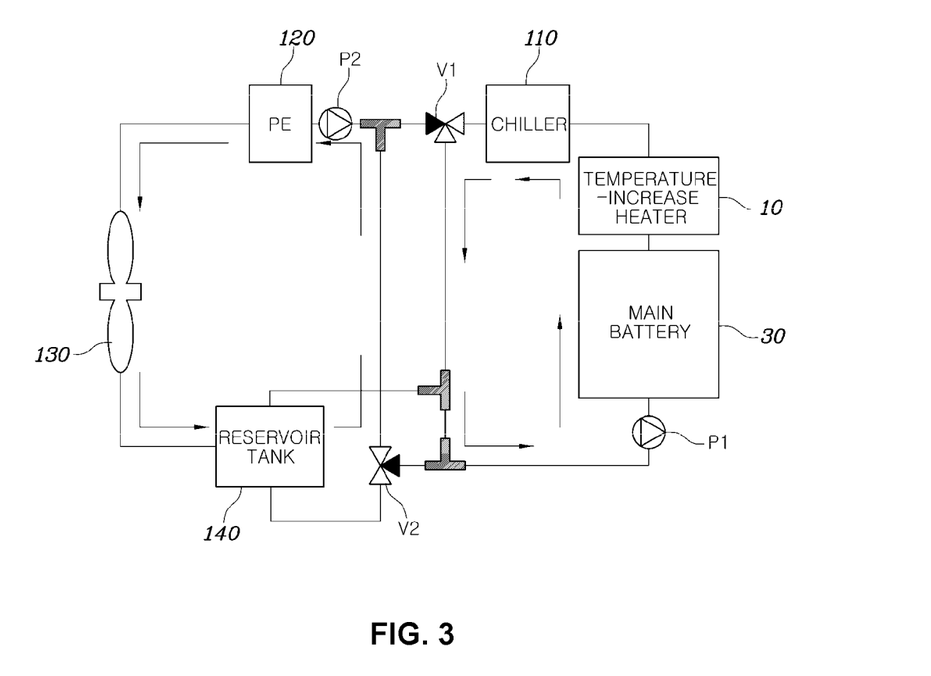

FIG. 2 and FIG. 3 illustrate examples of a water cooling system to which a system for managing the temperature of a battery according to an exemplary embodiment of the present invention is applied.

As illustrated in FIG. 2 and FIG. 3, as an example of a water-cooling system of an eco-friendly vehicle, the water-cooling system may include water pumps P1 and P2, a chiller 110, a power element (PE) 120, a radiator 130, a reservoir tank 140, and the like which are provided on a flow path 200 through which the cooling water flows, in addition to the battery 30 and the temperature-increase heater 10.

The water-cooling system may further include a first bypass channel 210 and a second bypass channel 220 so as to bypass the flow path 200.

In such a water cooling system, the main battery 30 and the PE 120 are elements to be cooled and the water pumps P1 and P2 are elements for circulating cooling water on the path. The temperature-increase heater 10, the chiller 110, and the radiator 130 are elements for adjusting the temperature of the cooling water, and the valves V1 and V2 are elements for adjusting the path of the cooling water. The reservoir tank 140 is an element for storing the cooling water.

In an exemplary embodiment of the present invention, the valve V1 is located between the radiator 130 and the temperature-increase heater 10 on the flow path 200 and the valve V2 is located between the radiator 130 and the battery 30, wherein the first bypass channel 210 connects the valve V2 and a first junction 215 located between the radiator 130 and the temperature-increase heater 10 on the flow path 200, and wherein the second bypass channel 220 connects the valve V1 and a second junction 225 of the flow path 200 located between the radiator 130 and the battery 30.

FIG. 2 and FIG. 3 illustrate a cooling water path which may be determined in a water cooling system.

FIG. 2 illustrates a cooling water path referred to as a separated cooling mode in which all the elements are disposed on one cooling water path by controlling the valves V1 and V2 so that the main battery 30 and the PE 120 are cooled with the same cooling water flow.

Furthermore, FIG. 3 illustrates a cooling water path referred to as an integrated cooling mode in which cooling is performed through one path for circulating cooling water through the battery 30, the temperature-increase heater 10, the chiller 110, and the water pump P1 and another separate path for circulating cooling water through the PE 120, the radiator 130, and the water pump P2 by controlling the valves V1 and V2.

In an exemplary embodiment of the present invention, when the temperature-increase heater relay 20 is fused, the controller 100 may determine the cooling water path as illustrated in FIG. 3, and may rapidly increase the temperature of the cooling water by the temperature-increase heater 10, inducing the disconnection of the thermal fuse 11.

Figure 4:
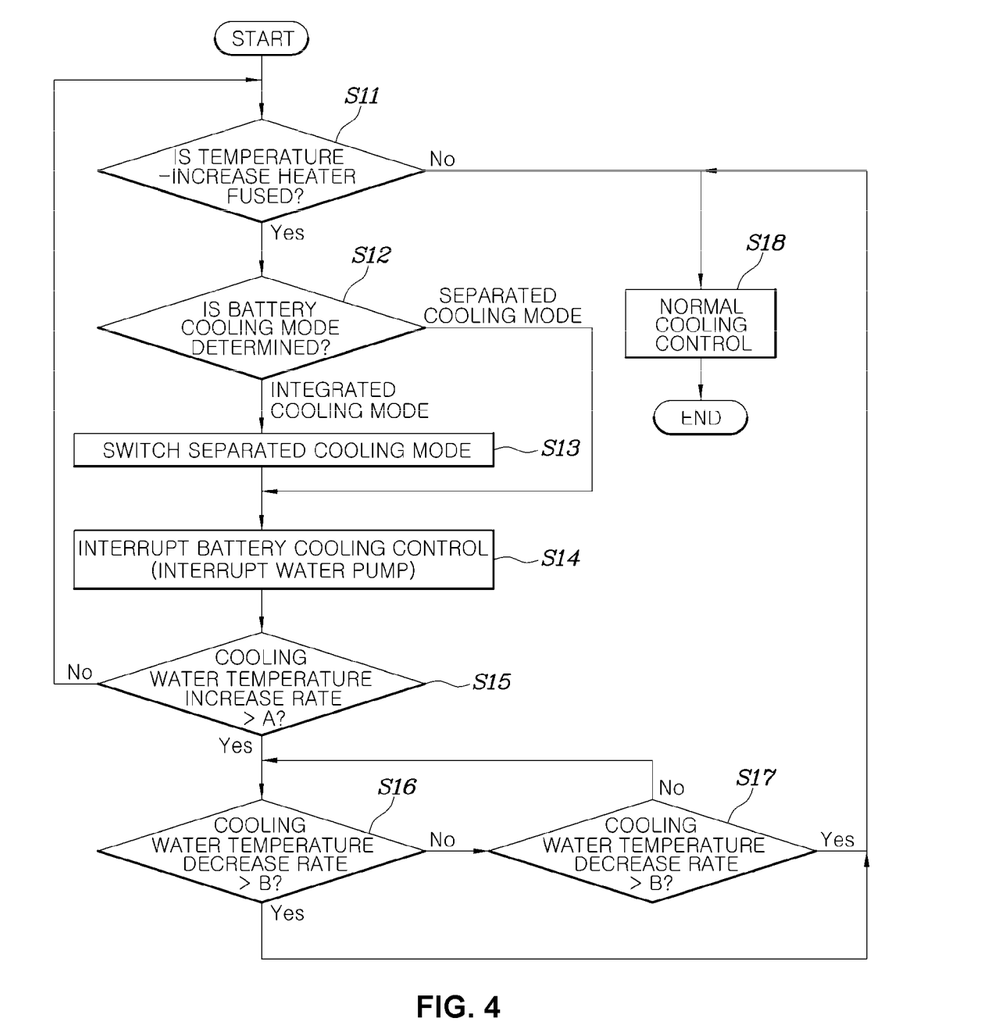
FIG. 4 is a flowchart illustrating a method for managing the temperature of a battery according to an exemplary embodiment of the present invention.
Figure 5:
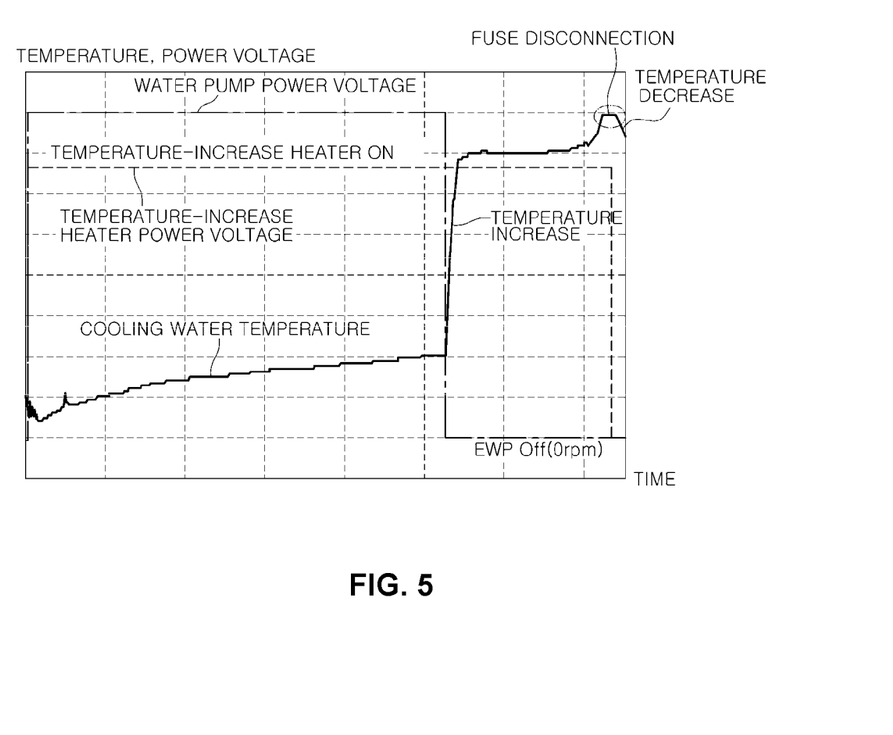
FIG. 5 is a graph illustrating changes in the temperature of a battery by a system and method for managing the temperature of a battery according to various embodiments of the present invention.

FIG. 4 is a flowchart illustrating a method for managing the temperature of a battery according to an exemplary embodiment of the present invention, and FIG. 5 is a graph illustrating changes in the temperature of a battery by a system and method for managing the temperature of a battery according to various embodiments of the present invention. The method for managing the temperature of the battery according to an exemplary embodiment of the present invention illustrated in FIG. 4 may be implemented by the above-described system for managing the temperature of the battery.

Referring to FIG. 4, in the method for managing the temperature of the battery according to an exemplary embodiment of the present invention, after a vehicle is started and the operation of the temperature-increase heater for increasing the temperature of the battery 30 is started, the controller 100 monitors whether the temperature-increase heater relay 20 is fused in operation S11.

In operation S18, when it is determined that the temperature-increase heater relay 20 is not fused, the controller 100 manages the temperature of the battery through a normal cooling control.

When it is determined that the temperature-increase heater relay 20 is fused, the controller 100 rapidly increases the temperature of the cooling water on the cooling water path to induce the disconnection of the thermal fuse 11. In an exemplary embodiment of the present invention, to rapidly increase the temperature of the cooling water supplied to the battery 30, the state of the cooling water path is determined in operation S12, the cooling water path is set to correspond to the separate cooling mode in operation S13, and then the operation of the water pump P1 for circulating the cooling water is interrupted at S14.

That is, when it is determined that the temperature-increase heater relay 20 is fused, the controller 100 determines whether the cooling water path through which the cooling water currently flows is in the integrated cooling mode in which all the elements to be cooled are cooled through one path (path illustrated in FIG. 2) or in the separated cooling mode in which the battery 30 and the PE 120 are cooled through separated individual cooling water paths (paths illustrated in FIG. 3) in operation S12. When the cooling water path is in the integrated cooling mode, the controller 100 switches the integrated cooling mode to the separated cooling mode by controlling the valves V1 and V2. Next, the controller 100 stops the circulation of the cooling water in the cooling water path where the temperature-increase heater 10 and the battery 30 are connected to each other by interrupting the operation of the water pump P1 at S14 and, inducing a rapid increase in the temperature of the cooling water.

As illustrated in FIG. 5, when the controller 100 cuts off the power voltage of the water pump, the temperature of the cooling water increases rapidly. Furthermore, the temperature of the cooling water decreases after the temperature of the cooling water increases to a certain level. This is because, when the operation of the water pump P1 is interrupted, the temperature-increase heater 10 continuously generates thermal energy due to the fusion of the temperature-increase heater relay 20 in a state in which the circulation of the cooling water is not performed so that the temperature of the cooling water increases rapidly. When the temperature of the cooling water increases to a temperature at which the thermal fuse 11 is disconnected, the electrical energy supplied to the temperature-increase heater 10 is cut off so that the operation of the temperature-increase heater 10 is interrupted, lowering the temperature of the cooling water.

In consideration of such changes in the temperature of the cooling water temperature, the controller 100 may determine whether the thermal fuse 11 is disconnected in accordance with the changes in the temperature of the cooling water after the operation of the water pump P1 is interrupted, and may perform the subsequent battery cooling control.

When the temperature of the cooling water increases to a disconnection temperature of the thermal fuse 11 or higher after the operation of the water pump P1 is interrupted in operation S14, the controller 100 may determine that the thermal fuse 11 is disconnected, and may restart the interrupted water pump P1 to cool the battery 30 by the cooling water. The disconnection temperature of the thermal fuse 11 may be determined by the specification of the thermal fuse 11 determined when the thermal fuse 11 is manufactured.

The controller 100 may determine whether the temperature of the cooling water increases at a rate exceeding a predetermined temperature increase rate A per hour in operation S15 after the operation of the water pump P1 is interrupted in operation S14. When the temperature of the cooling water increases or does not increase at a rate equal to or lower than the predetermined temperature increase rate A per hour, it is possible to suspect that the operation of the temperature-increase heater 10 is interrupted because the temperature does not increase significantly even though the circulation of the cooling water is stopped, and therefore it is preferable to determine again whether the temperature-increase heater relay 20 is fused in operation S15.

In the case in which the temperature of the cooling water increases at a rate exceeding the predetermined temperature increase rate A per hour at S15, the controller 100 determines whether the temperature of the cooling water decreases at a rate exceeding a predetermined temperature decrease rate B per hour in operation S16 when the temperature of the cooling water starts to decrease after a predetermined time has elapsed.

When the temperature of the cooling water decreases at a rate exceeding the predetermined temperature decrease rate B per hour, the controller 100 determines that the thermal fuse 11 is disconnected and the operation of the temperature-increase heater 10 is interrupted, and restarts the water pump P1 to cool the battery 30 by the cooling water.

Meanwhile, when the temperature of the cooling water decreases or does not decrease at a rate equal to or lower than the predetermined temperature decrease rate B per hour, the controller 100 determines that the thermal fuse has already been disconnected because the temperature does not decrease due to other factors when a predetermined time C has elapsed at S17 since the temperature of the cooling water has increased at the rate exceeding the predetermined temperature increase rate A per hour, and restarts the water pump P1 to cool the battery 30 by the cooling water at S18.

As described above, the system and method for managing the temperature of the battery according to various embodiments of the present invention may disconnect the thermal fuse of the power line of the temperature-increase heater by inducing a rapid temperature increase, in a state in which the operation of the temperature-increase heater cannot be interrupted through the control of the temperature-increase heater relay due to the fusion of the temperature-increase heater relay, interrupting the operation of the temperature-increase heater. Accordingly, the system and method for managing the temperature of the battery according to various embodiments of the present invention may operate the battery without shutting down the vehicle itself when the temperature-increase heater relay is fused as in the conventional case, so that the vehicle may be normally driven.

The system and method for managing the temperature of the battery according to various embodiments of the present invention may separate the cooling water path into a path for cooling the electric parts and a path for cooling the battery when the temperature-increase heater relay is fused and may induce a rapid temperature increase only in the path for cooling the battery to disconnect the thermal fuse, preventing adverse influence on the cooling of the electric parts.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for managing temperature of a battery, comprising:
   the battery configured to store electrical energy;
   a temperature-increase heater configured to convert the electrical energy stored in the battery into thermal energy to increase the temperature of the battery;
   a temperature-increase heater relay configured to connect or disconnect an electrical energy path provided between the battery and the temperature-increase heater;
   a thermal fuse configured to disconnect the electrical energy path when the temperature of the battery is equal to or higher than a predetermined reference temperature; and
   a controller configured to induce disconnection of the thermal fuse by increasing the temperature of the battery to the predetermined reference temperature or higher using the thermal energy converted by the temperature-increase heater, when the temperature-increase heater relay is fused.

2. The system for managing the temperature of the battery of claim 1, further including:
   a water pump configured to provide cooling water to the battery, wherein the temperature-increase heater increases the temperature of the battery by heating the cooling water with the converted thermal energy.

3. The system for managing the temperature of the battery of claim 2, wherein, when the temperature-increase heater relay is fused, the controller interrupts operation of the water pump.

4. The system for managing the temperature of the battery of claim 3, wherein the controller interrupts the operation of the water pump, and then operates the water pump to cool the battery when the temperature of the cooling water has decreased at a rate more than a predetermined temperature decrease rate per hour after the temperature of the cooling water has increased at a rate more than a predetermined temperature increase rate per hour.

5. The system for managing the temperature of the battery of claim 3, wherein the controller interrupts the operation of the water pump, and then operates the water pump to cool the battery when a predetermined time has elapsed after the temperature of the cooling water has increased at a rate more than a predetermined temperature increase rate per hour.

6. The system for managing the temperature of the battery of claim 1, wherein a power relay assembly is provided at a terminal of the battery and the temperature-increase heater relay is provided at a terminal of the power relay assembly.

7. A system for managing temperature of a battery, comprising:
   a water pump mounted on a flow path and configured to circulate cooling water along the flow path;
   the battery disposed on the flow path of the cooling water to perform heat exchange with the cooling water, and to store electrical energy;
   a temperature-increase heater disposed on the flow path and configured to increase the temperature of the battery by converting the electrical energy stored in the battery into thermal energy to heat the cooling water;
   a temperature-increase heater relay configured to selectively connect an electrical energy path provided between the battery and the temperature-increase heater;
   a thermal fuse configured to disconnect the electrical energy path when temperature of the cooling water is equal to or higher than a predetermined reference temperature;
   a radiator disposed on the flow path of the cooling water to decrease the temperature of the cooling water;
   a valve positioned on the flow path and configured to be opened or closed to change a circulation path of the cooling water; and
   a controller connected to the valve and configured to determine the circulation path of the cooling water by adjusting the valve when the temperature-increase heater relay is fused, and to induce disconnection of the thermal fuse by interrupting an operation of the water pump and increasing the temperature of the cooling water to the predetermined reference temperature or higher using the thermal energy converted by the temperature-increase heater.

8. The system for managing the temperature of the battery of claim 7,
   wherein the circulation path includes a first circulation path and a second circulation path, and
   wherein the first circulation path through which the cooling water flows between the radiator and the battery and the second circulation path through which a flow of the cooling water is blocked between the radiator and the battery are formed by opening or closing the valve.

9. The system for managing the temperature of the battery of claim 8,
   wherein the water-cooling system further include a first bypass channel and a second bypass channel,
   wherein the valve includes a first valve located between the radiator and the temperature-increase heater on the flow path and a second valve located between the radiator and the battery,
   wherein the first bypass channel connects the second valve and a first junction located between the radiator and the temperature-increase heater on the flow path, and
   wherein the second bypass channel connects the first valve and a second junction of the flow path located between the radiator and the battery.

10. The system for managing the temperature of the battery of claim 9,
    wherein the first circulation path through which the cooling water flows between the radiator and the battery is formed while the first bypass channel and the second bypass channel are closed by opening the first and second valves, and
    wherein the second circulation path through which the cooling water flows among the water pump, the battery, and the temperature-increase heater is formed while the first bypass channel and the second bypass channel are opened by opening the first and second valves, respectively.

11. The system for managing the temperature of the battery of claim 9, wherein, when the temperature-increase heater relay is fused, the controller forms the second circulation path by adjusting the valve and interrupts the operation of the water pump.

12. The system for managing the temperature of the battery of claim 11, wherein the controller interrupts the operation of the water pump, and then operates the water pump to cool the battery when the temperature of the cooling water has decreased at a rate more than a predetermined temperature decrease rate per hour after the temperature of the cooling water has increased at a rate more than a predetermined temperature increase rate per hour.

13. The system for managing the temperature of the battery of claim 11, wherein the controller interrupts the operation of the water pump, and then operates the water pump to cool the battery when a predetermined time has elapsed after the temperature of the cooling water has increased at a rate more than a predetermined temperature increase rate per hour.

14. A method for managing the temperature of the battery using the system for managing the temperature of the battery of claim 1, comprising:
    monitoring, by a controller, whether the temperature-increase heater relay is fused;
    interrupting, by the controller, operation of the water pump when the controller determines that the temperature-increase heater relay is fused; and
    monitoring the temperature of the cooling water after the operation of the water pump is interrupted, and determining whether the thermal fuse is disconnected based on the temperature of the cooling water or a temperature increase or decrease rate of the cooling water.

15. The method for managing the temperature of the battery of claim 14, further including: switching an integrated cooling mode of the system to a separated cooling mode after the controller determines that the temperature-increase heater relay is fused.

16. The method for managing the temperature of the battery of claim 14,
  wherein the determining includes determining that the thermal fuse is disconnected when the temperature of the cooling water increases to a predetermined temperature or higher and then decreases.

17. The method for managing the temperature of the battery of claim 14, wherein the determining includes determining that the thermal fuse is disconnected when the temperature of the cooling water has decreased at a rate more than a predetermined temperature decrease rate per hour after the temperature of the cooling water has increased at a rate more than a predetermined temperature increase rate per hour.

18. The method for managing the temperature of the battery of claim 14, wherein the determining includes determining that the thermal fuse is disconnected when a predetermined time has elapsed after the temperature of the cooling water has increased at a rate more than a predetermined temperature increase rate per hour.

19. The method for managing the temperature of the battery of claim 14, after the controller is configured to determine that the thermal fuse is disconnected in the determining, further including:
  operating the water pump again.

* * * * *